United States Patent [19]

Grizmala et al.

[11] Patent Number: 5,166,954
[45] Date of Patent: Nov. 24, 1992

[54] ADAPTIVE SYSTEM FOR MEASURING THE BROADBAND SIGNAL-TO-NOISE RATIO OF A TRANSMISSION CHANNEL

[75] Inventors: Fredrick Grizmala, Lincroft; Robin Levonas, Tinton Falls, both of N.J.

[73] Assignee: AT&T Bell Laboratories, Murray Hill, N.J.

[21] Appl. No.: 664,908

[22] Filed: Mar. 5, 1991

[51] Int. Cl.[5] .......................... H04B 3/46; H04B 1/10
[52] U.S. Cl. ........................ 375/10; 375/103;
370/13; 328/162; 379/6; 455/226.1; 364/572;
364/481
[58] Field of Search ................ 375/10, 14, 27, 103;
370/13, 17; 328/162; 379/6; 455/226; 364/572,
481; 371/22

[56] References Cited

U.S. PATENT DOCUMENTS

| | | | |
|---|---|---|---|
| 4,028,622 | 6/1977 | Evans et al. | 328/162 |
| 4,246,655 | 1/1981 | Parker | 455/226 |
| 4,275,348 | 6/1981 | Bayer et al. | 324/57 |
| 4,417,337 | 11/1983 | Favin et al. | 371/22.3 |
| 4,519,084 | 5/1985 | Langseth | 375/103 |
| 4,768,203 | 8/1988 | Ingle | 375/10 |
| 4,864,590 | 9/1989 | Arnon et al. | 375/103 |

*Primary Examiner*—Curtis Kuntz
*Assistant Examiner*—Young Tse
*Attorney, Agent, or Firm*—F. B. Luludis

[57] ABSTRACT

A facility is provided for measuring the signal-to-noise ratio of a transmission channel using the results obtained by transmitting over the channel a pseudorandom noise signal, in which the value of the signal-to-noise ratio may be used to determine whether the channel contains various types of pulse code modulation equipment.

20 Claims, 7 Drawing Sheets

ADAPTIVE SYSTEM FOR MEASURING THE BROADBAND SIGNAL-TO-NOISE RATIO OF A TRANSMISSION CHANNEL

BACKGROUND OF THE INVENTION

In telecommunications facilities, Adaptive Differential Pulse Code Modulation (ADPCM) is used to effectively double the transmission capacity of a Pulse Code Modulation (PCM) system employing, for example, 24 channels of 64 kilobits each channel. An ADPCM system does this by quantizing (compressing) an eight-bit signal sample into, for example, a four-bit sample. A by-product of The ADPCM quantizing process is so-called quantizing noise. The level of quantizing noise that is generated is typically minimal when an ADPCM is processing speech signals. However, in other instances the level of quantizing noise may be significant, such as when an ADPCM is processing, for example, voiceband data signals transmitted by modem equipment. A significant level of quantizing noise occurs because voiceband data transmissions are random, wideband signals, which undermine the capability of the ADPCM quantizing process to effectively predict and adapt to such signals.

Accordingly, there is a need to identify which transmission circuits of a telecommunications network contain ADPCM equipment so that such circuits are not used for the transmission of wideband data signals. To this end, various types of transmission tests have been developed to measure the Signal-to-Noise Ratio (SNR) of a transmission circuit as a way of determining if ADPCM equipment is present in a transmission circuit. One such prior test (disclosed in U.S. Pat. No. 4,768,203) employs a multitone test signal, e.g., a signal composed of twenty-one discrete tones, to detect the presence of ADPCM in a telecommunications network circuit (channel). In this arrangement, the twenty-one discrete tones are combined with a predetermined phase relationship and then transmitted over a target transmission channel. A receiver at the opposite end of the channel filters out the noise signal introduced by the transmission channel by performing a Fast Fourier Transform on the signals that it receives to remove the energy power contained in the appropriate frequency bins. The resulting SNR value of the received signal should then indicate whether the channel contains one or more ADPCMs.

Disadvantageously, the SNR value obtained using twenty-one tones is susceptible to corruption by so-called intermodulation products falling within the frequency bins that contribute to the signal power level. Accordingly, the twenty-one tone measurement has to be performed a number of times to obtain an average SNR value, which, hopefully, represents an accurate SNR value for the channel that is being measured.

SUMMARY OF THE INVENTION

The art of measuring the signal-to-noise ratio of a transmission channel to determine the possible presence of ADPCM is advanced, in accord with the invention, by transmitting at one end of the channel a pseudorandom signal constrained to a predetermined bandwidth and receiving at the other end of the channel the resulting signal for processing to determine the level of the aforementioned signal-to-noise ratio. In accord with an aspect of the invention, the transmission of the constrained pseudorandom signal is preceded, for a predetermined duration, by a signal of a predetermined frequency in which the phase of the predetermined frequency is changed at a point in time during the duration to synchronize the receiver with the transmission of the pseudorandom signal. In accord with another aspect of the invention, a signal-to-noise ratio of the channel with respect to the predetermined frequency signal is also determined to provide a measure of the overall transmission quality of the channel.

BRIEF DESCRIPTION OF THE DRAWINGS

In the drawings:

FIGS. 9 and 10 respectively illustrate the layout of the ROM and RAM memories contained in the receiver of FIG. 1.

DETAILED DESCRIPTION

Figure 1:
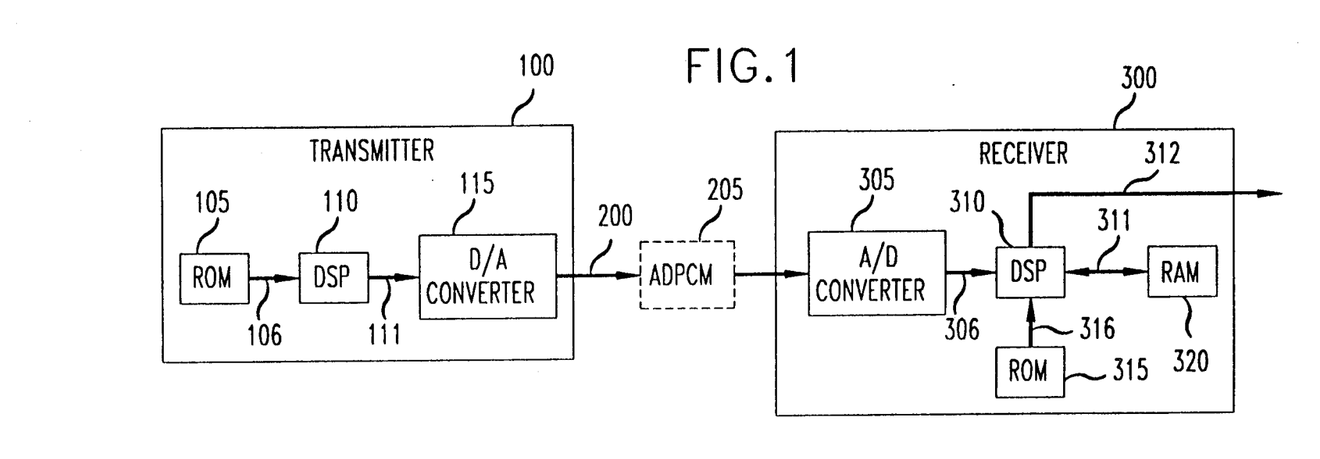
FIG. 1 is a simplified block diagram of an illustrative transmission test system in which the principles of the invention may be practiced.

Turning now to FIG. 1, there is shown an illustrative embodiment of the invention comprising transmitter 100 and receiver 300 connected to one another via communication path 200. Communications path 200 represents herein an end-to-end connection, which may be established by either a private or public network and which may contain one or more ADPCMs, such as ADPCM 205. As is well-known, path 200 may also contain various types of switching and transmission equipment (not shown) operable for establishing path 200. As is also well-known, such equipment may change, to a certain degree, the shape of signals passing through path 200, and subject such signals to a certain amount of propagation delay.

The presence of ADPCM equipment in a transmission path as well as the degree of channel shaping imposed by the path may be readily determined by transmitter 100 and receiver 300 when they are arranged in accordance with the principles of the invention.

In particular, transmitter 100 comprises Digital Signal Processor (DSP) 110, which may be, for example, the WEDSP16A available from AT&T. The program which implements the invention in DSP 110 is stored in ROM 105, in which ROM 105 may be, for example, the model 27C512 electrically programmable ROM available from Texas Instruments. Also stored in ROM 105 is a series of digital samples of a signal (tone) having a predetermined frequency—illustratively a frequency of 1004 Hz. DSP 110 operating under the control of the program stored in ROM 105 sequentially unloads the samples from ROM 105 and passes them one at a time to Digital-to-Analog Converter (DAC) 115 operating at a sampling clock rate of, for example, 16,000 Hz. DAC 115, in a conventional manner, converts each digital sample of a signal that it receives from DSP 110 into an analog equivalent and outputs the result to communications path 200 (hereinafter "channel" 200) for transmission to receiver 300.

Figure 2:
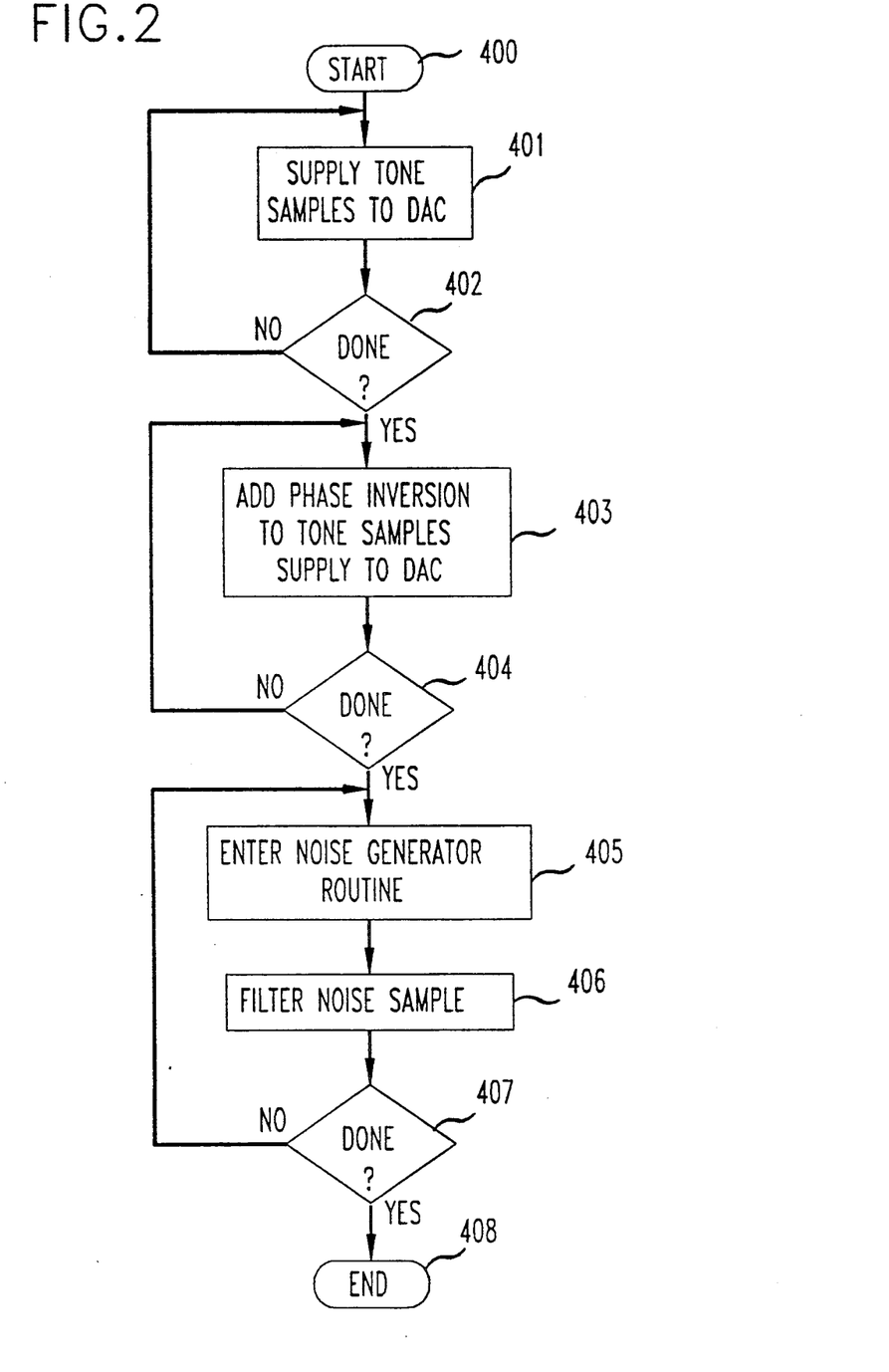
FIG. 2 shows, in flow chart form, the program which implements the invention in the transmitter of FIG. 1.
Figure 3:
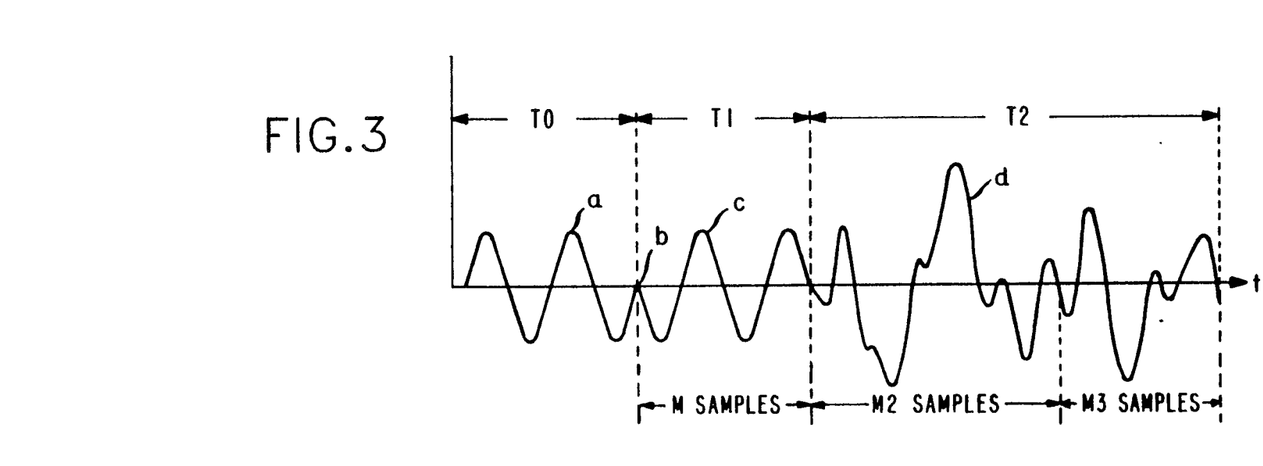
FIG. 3 illustrates the various signals that the transmitter of FIG. 1 transmits over a transmission channel.

The overall operation of transmitter 100 may be appreciated with reference to FIGS. 2 and 3, in which FIG. 2 shows in flow chart form the program which implements the invention in transmitter 100 and in which FIG. 3 illustrates the signals that transmitter 100 outputs to channel 200. Specifically, when transmitter 100 is turned on and DSP 110 is "booted up" the program of FIG. 2 is invoked at block 400. At block 400, the program initializes a software counter and then proceeds to block 401. At block 401, the program unloads from ROM 105 a digital sample of the 1004 Hz signal (tone) and passes the sample to DAC 115 for transmission to channel 200 in an analog form, as illustrated by signal "a" of FIG. 3. The program then proceeds to block 402 where it increments the counter and then compares the contents of the counter with a predetermined value indicative of time period, or interval, T0. In an illustrative embodiment of the invention, interval T0 may be, for example 1.0 seconds. If value of the contents of the counter equals the predetermined value then the program proceeds to block 403. Otherwise, the program returns to block 401 where it unloads the next sample of the 1004 Hz tone for transmission to channel 200, in the manner discussed above.

At block 403, the program initializes the software counter and, during interval T1, continues to transmit the 1004 Hz tone signal "c". In doing so, however, the program reverses the phase of the tone signal, as represented at point "b" of FIG. 3, in which the phase reversal is—illustratively 180 degrees. The reason for the phase reversal will be made apparent below in connection with a discussion of the operation of receiver 300. Similarly, the program at block 404 increments the software counter and then compares the value of the counter with the aforementioned predetermined number to determine if it has transmitted the tone signal for T1 seconds. If the value of the software counter equals the predetermined number then the program proceeds to block 405. Otherwise, the program returns to block 403 where it unloads from ROM 405 the next digital sample of the 1004 Hz tone, and then compliments the digital value to reverse the phase of the analog equivalent that is transmitted to channel 200, as represented by signal "c" of FIG. 3.

At block 405, the program initializes the aforementioned software counter and enters a software program which implements a conventional noise generator. The noise generator program generates a digital sample of a pseudorandom noise signal (represented by signal "d" of FIG. 3) and pases the sample to a low pass filter, which is implemented at block 406 of the program. The low-pass filter of block 406 is designed in a conventional manner to pass the energy of noise signals having a frequency within the frequency range of—illustratively 0 Hz to 4000 Hz. A filtered sample is then passed to DAC 115 which transmits to channel 200 the analog equivalent thereof. The program then proceeds to block 407 where it increments the aforementioned software counter and then compares the value of the counter with another predetermined value indicative of the value of time period, or interval T2. In an illustrative embodiment of the invention, interval T2 may be, for example, 2.0 seconds. If the contents of the software counter equals the other predetermined value, then the program exits via block 408. Otherwise, the program returns to block 405 where it generates the next sample of the pseudorandom noise signal for transmission to channel 200.

Referring once again to FIG. 1, it is seen that receiver 300 comprises a conventional Analog-to-Digital Converter (ADC) 305 for converting into respective digital samples analog signals received via channel 200, in which ADC 305 operates at sampling clock rate of, for example, 16,000 Hz. Each such sample is then presented to DSP 310, which operates under the control of a program stored in ROM 315. (ROM 315 may be, for example, the same model as ROM 105.) DSP 310, which may be, for example, the same model as DSP 110, stores in sequential memory locations of RAM memory 320 the digital samples that are received via bus 306. At the end of interval T2 (FIG. 3), DSP 310 then processes the stored samples to determine the SNR value of channel 200 with respect to the 1004 Hz tone and with respect to the pseudorandom noise signal, as will be explained below.

Figures 4, 5:
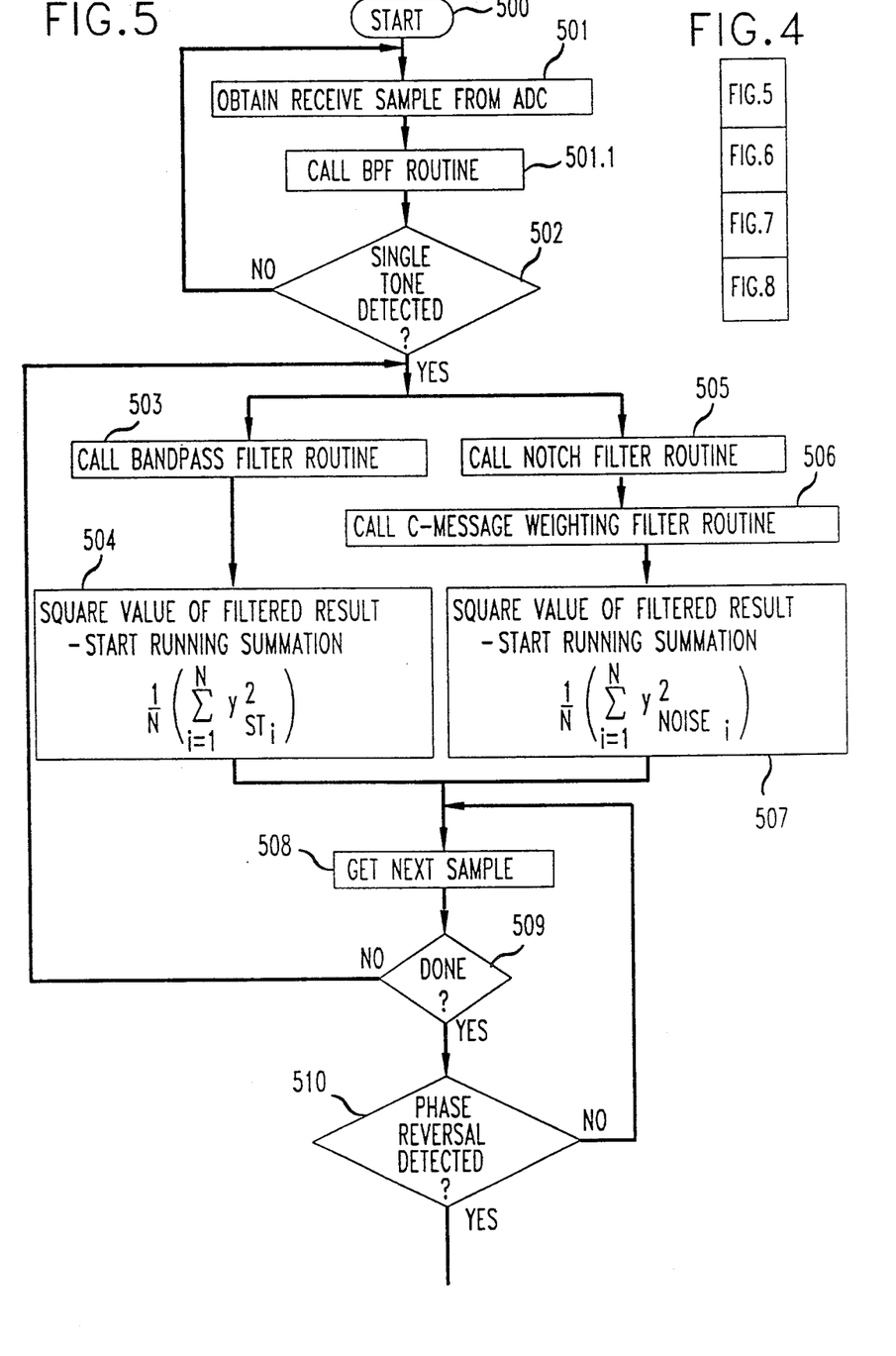
FIG. 4 shows the manner in which FIGS. 5 through 8 should be arranged.
FIGS. 5 through 8 show, in flow chart form, the program which implements the invention in the receiver of FIG. 1.

We turn now to FIGS. 5 through 8, which should be arranged as shown in FIG. 4 and which show in flow chart form the program that implements the invention in receiver 300. Specifically, when receiver 300 is turned on and is, therefore, "booted up", the program is entered at block 500 where it proceeds to block 501. The program at block 501, reads from bus 306 (FIG. 1) a digital sample, stores the sample in memory and then proceeds to block 501.1. At block 501.1, the program enters a conventional bandpass filter (BPF) routine which implements a bandpass filter centered at 1004 Hz to remove from the received sample energy contributed by frequencies other than 1004 Hz. The filtered sample is then passed to block 502 which determines if the received sample is indicative of the presence of the 1004 Hz tone. The program at block 502 uses a conventional "zero crossing" technique to make that determination. That is, the program at block 502 "looks" for a sign change between adjacent samples and if such a change occurs between the seventh and eighth ones of such samples, then the last incoming signal sample is taken to represent a zero crossing. When the program detects a number—illustratively fifty—of such zero crossings, then the program considers the incoming signal to be a 1004 Hz signal. (The program may proceed in this manner since, for a 1004 Hz signal, a sign change occurs between the seventh and eighth ones of the signal samples.) Thereafter, the program enters a number of different software routines to process each succeeding sample of the 1004 Hz signal that is received via ADC 305 and stored in memory.

One such software routine is represented by blocks 503 and 504, in which block 503 enters the aforementioned conventional bandpass filter centered at 1004 Hz. The filtered sample is then passed to block 504, which implements a power function by squaring the value of the filtered sample and adding the result to a running summation (accumulation) of such results (the equation defining the latter power function is shown in block 504).

Another, but similar, software routine is represented by blocks 505 through 507, in which block 505 implements a conventional notch filter centered at 1004 Hz to remove from the received sample energy that is contributed by the 1004 Hz signal, thereby resulting in a filtered sample indicative of noise. Each such filtered noise sample is passed to block 506, which weights the noise sample in accordance with a predefined C-message weighting function. (C-message weighting is discussed in the text entitled *Transmission Systems for Communications*, fourth edition, Published by Bell Telephone Laboratories, which is hereby incorporated by reference.) The weighted noise sample is then passed to block 507, which also implements a power function by squaring the value of the weighted noise sample and adding the result to a running summation of such results. (The equation defining the latter power function is shown in block 507.) As will be discussed below, the final results determined at blocks 504 and 507 will be used to determine the SNR value for channel 200 with respect to the 1004 Hz signal.

Continuing, at block 508, the program obtains the next signal sample that ADC 305 presents to DSP 310 and then proceeds to block 509. At block 509, the program checks to see if it has processed N (e.g., 8900) samples of the 1004 Hz tone signal that is being recieved by ADC 305. If the program finds that is not the case, then it returns to the "yes" leg out of block 502 to process the current sample in the manner discussed above. Otherwise, the program proceeds to block 510 where it enters a well-known software process that is designed to detect the aforementioned 1004 Hz phase reversal. Receiver 300 uses the phase reversal to synchronize an associated noise generation software routine (discussed below) with the noise samples that are transmitted by transmitter 100.

Specifically, the process at block 510 relies on the fact that during intervals T0 and T1 (FIG. 3) the 1004 Hz tone contributes most of the energy that is contained in the signal that is being received by ADC 305. However, at the phase reversal, most of the signal energy is momentarily distributed across the band, i.e., from 0 to 4 KHz.

To detect the reversal, block 510, like the processes performed at blocks 503 and 505, passes the received sample through a bandpass filter and also through a notch filter both centered at 1004 Hz. The absolute values of the outputs of the bandpass and notch filters are then passed through respective low-pass filters to "smooth out" the absolute values. The outputs of the low-pass filters are then summed with the result of the signal path containing the notch filter and summed with a negative sign. The result of the summation will be positive for signals occurring before the reversal and negative for signals occurring at the reversal. Accordingly, for a positive value, block 510 returns to block 508 to obtain the next sample that ADC 305 presents to DSP 310 and then determines if the current sample represents a phase reversal. Block 510 continues in that manner until the result of the aforementioned summation is negative, at which point, block 510 proceeds to block 511, where it synchronizes receiver 300 with the noise samples supplied by transmitter 100.

To implement such synchronization, the program at block 511 counts the number of samples that DSP 310 receives from ADC 305 following the detection of the sample representing the phase reversal. When the number reaches a predetermined value, for example, a value of 8000 represented as M in FIG. 3, then the program proceeds to block 512.

It can be appreciated that the initial transmission of the noise signal at transmitter 100 could cause transient signals to occur in channel 200. To deal with this possible problem, receiver 300 waits a predetermined period of time, for example, a time represented by M2 samples as shown in FIG. 3, before it begins storing in a RAM 320 (FIG. 3) receive table samples of the noise signal that is received at ADC 305 and storing in a RAM 320 reference table samples of a reference noise signal that receiver 300 generates.

In particular, when DSP 310 is presented with the next sample of the incoming channel 200 signal, the program at block 512 increments by the value of one a software counter and then proceeds to Block 513. At block 513, the program enters a software routine which locally generates a reference sample of the incoming noise signal, in which the receiver 300 noise generator routine is identical to the noise generator routine contained in transmitter 100. The program then enters the aforementioned low-pass filter routine to filter out frequency components having frequencies above 4.0 KHz. The program then proceeds to block 514, where it returns to block 512 if it finds that the value of the count begun at block 512 is not greater than the value of M2. Otherwise, the program proceeds to block 515 where it stores in the RAM 320 reference and receive tables the current reference noise sample and the current noise sample received via ADC 305, respectively. In addition, the program begins to count the number of those samples that it is storing in RAM 320. The program then proceeds to block 516.

At block 516, the program checks the value of the count begun at block 515 to determine if a sufficient number of locally generated reference noise samples and received noise samples have been stored in RAM 320. The program does this by comparing the value of the count less the value of M3, in which the value of M3 may be, for example, 8900. Accordingly, the program proceeds to block 517 when it finds that it has stored a desired number of those samples.

Thus, at this point, the program would have stored in sequential locations of the above-mentioned RAM 320 tables 8900 samples of filtered, locally generated reference noise samples and 8900 samples of the received signal, in which the former samples should be correlated in time with the latter samples.

Continuing, at block 517, the program enters a conventional Adaptive Finite Impulse Response (AFIR) filter routine which implements an AFIR filter having a predetermined number of filter taps—illustratively two hundred—to process the samples stored in the RAM 320 reference and receive tables. In doing so, the AFIR filter routine operating in conjunction with a conventional Least Means Squares (LMS) coefficient update routine entered at block 518 adapts to the impulse response of the pertinent transmission path, i.e., channel 200.

In particular, the basic structure of an AFIR filter typically comprises a chain of delay stages (for example register circuits) for storing digital samples of a signal. In software, a series of RAM memory locations internal to DSP 310 are used to implement the delay stages. In addition, each tap of the AFIR filter requires a number, e.g., three, DSP 310 internal RAM locations. One such location is used to store the filter input samples and the remaining locations are used for storing the respective tap coefficient value. Thus, 600 DSP 310 RAM memory locations are used to implement an AFIR having 200 taps (registers). To begin with, the digital sample stored at the first location of the reference table is retrieved and stored in the first of the two hundred memory locations. The value contained in each of the two hundred memory location is then multiplied by a respective tap coefficient ($C_k$) stored in the DSP 310 TAP coefficient table and the result of each such multiplication is then summed to generate a digitally filtered version of the stored samples. The difference between the value of the digitally filtered sample and the value of the first sample stored in the receive table is then calculated to generate an error value $e_i$. The AFIR filter routine at block 517 then shifts each sample down the chain by one memory location to the next memory location to prepare the first memory location for receipt of the next sample stored in the RAM 320 reference table. The AFIR routine then passes to the LMS routine at block 518 the resulting error value $e_i$. The LMS routine, in accordance with the illustrative equation shown in block 518, changes (calculates) the values of the tap coefficients commensurate with the error value that it receives, and does so to minimize the error between the output $y_i$ of the AFIR filter and the corresponding receive sample. The updated values for the tap coefficients are then stored in respective locations of the coefficient table. For the equation shown in block 518, $C_{k+1}$ represents the value of the $k^{th}+1$ tap coefficient vector, after being updated by the $k^{th}$ tap coefficient vector, $C_k$, with the update term $2\mu e_k X_k$, where $C_k=[C_{1k}, C_{2k}, C_{3k}, \ldots, C_{200k}]^T$ represents the coefficient vector at iteration k with $C_{ik}$ equal to the value of the $i^{th}$ coefficient at iteration k, and $X_k=[x_k, x_{k-1}, x_{k-2}, \ldots, x_{k-199}]^T$ represents the input vector at iteration k with $x_{k-i}$ equal to the $i^{th}$ input sample at iteration k, and $e_k$ is equal to the $k^{th}$ error sample; $\mu$ is a constant, having a value of, for example, 0.00195. In an illustrative embodiment of the invention, 8800 of the samples contained in the reference and receive tables are sequentially processed by the routines represented by blocks 517 and 518 to converge on the impulse response of channel 200. That is, at the end of the adaptation process the magnitudes of a group of tap coefficients stored in sequential locations of the coefficient table should closely approximate the sought-after response.

The program at block 519 determines in a conventional manner whether 8800 of such samples have been so processed. If not, then the program returns to block 517 where it reenters the AFIR filter routine. The AFIR filter routine, in turn, supplies to the first one of the aforementioned two hundred RAM memory locations forming the delay stages of the AFIR filter the sample value stored in the next location of the reference table. The AFIR filter and LMS routines then proceed in the manner described above. If, on the other hand, the program finds that the latter routines have indeed processed 8800 samples, then it proceeds to block 520.

At block 520, the program enters an "Impulse Response Repositioning" software routine that deals with any possible inaccuracy in the detection of the aforementioned phase reversal that is performed at block 510 and the limitation of using an AFIR filter having a finite length, i.e., a length of 200 taps. Specifically, the routine entered at block 520 generates a pointer offset that, when used in conjunction with the AFIR and LMS routines, has the effect of repositioning the impulse response determined above so that the available dispersion coverage may be used efficiently. The program does this by scanning the filter coefficient file to locate the tap coefficient having the largest magnitude. As is well-known the largest of such tap coefficients usually identifies the beginning of the impulse response of a so-called well-behaved connection. Once the largest coefficient is located, its position in the file relative to a reference point of zero associated with the position of the first coefficient in the file is noted. Using the noted information, the program then generates an offset value that, when used in conjunction with the aforementioned routines, repositions (moves) the impulse response either forward or backwards to some optimum location in the AFIR filter. In an illustrative embodiment of the invention, such an optimum location may be, for example, a location relative to the location at which the thirtieth tap is stored in the coefficient table. Thus, a repositioning, or offset, value is calculated by subtracting from the relative location of the largest coefficient the optimal location of the impulse response in the AFIR filter.

Following the above calculation, the program proceeds to block 521 where it "recalculates" the aforementioned response by reentering blocks 517 through 519 in the order shown in the FIG. In doing so, the values of the tap coefficients in the coefficient table are initialized to zero and the offset value, or number, is used as an offset into the receive table. When the AFIR routine operating in conjunction with the LMS routine has processed 8800 samples contained in the reference table and corresponding samples contained in the receive table, the program proceeds to block 522.

At block 522, the program initializes so-called reference and receive table pointers including the offset value calculated at block 520 that the AFIR routine uses to read samples from those tables. The program then proceeds to block 523. Blocks 523 through 527 represent a loop which the programs enters 8800 times to once again filter 8800 samples contained in the reference table. In this instance, however, the 8800 samples are filtered using the tap coefficients that the LMS routine calculated during its last entry at block 521. The AFIR filter, after having adapted to the impulse response of channel 200 and having been optimally positioned within the adaptive filter, generates an output sample, $y_i$, that is indicative of the signal energy contained within the received signal samples. That is, the AFIR filter output, $y_i$ is an estimate of the received signal and therefore can be subtracted from the composite received signal leaving only the noise component, $e_i$, introduced by channel 200 and ADPCM 205.

Specifically, at block 523, the program enters the AFIR routine which filters, in the manner discussed above, the first sample contained in the transmit reference table. At block 524, the program performs a power function by squaring the value of the filtered result, $y_i$, and starts a running summation of such values as defined by the equation shown in block 524. At block 525, the program passes to the C-message filter routine the corresponding error value $e_i$ that the AFIR routine calculates. The weighted error value $e_i$ that the C-message filter routine generates is then squared at block 526. Similarly, the program at block 526 performs a power function for the weighted error value $e_i$ as defined by the equation shown in block 526. At block 527, the program determines if 8800 samples have been filtered. If not, the program returns to block 523 to filter the next samples in the receive and reference tables and processes the filtered results thereof via blocks 524 through 526. If, on the other hand, the program finds that 8800 of such samples have been filtered and processed, then it proceeds to block 528.

At block 528, the program calculates and outputs to a terminal (not shown) via bus 312 (FIG. 1) the SNR value of the channel 200 response to the pseudorandom noise signal. The program calculates that SNR value by dividing the final value of the summation determined at block 524 by the final value of the summation determined at block 526, as defined by the equation shown in block 528. Similarly, the program at block 529 calculates and outputs to the aforementioned terminal the SNR value of the channel 200 response to the aforementioned single tone (1004 Hz signal). The program calculates the latter SNR value by dividing the final value of the summation determined at block 504 by the final value of the summation determined at block 507, as defined by the equation shown in block 529. It is noted that the latter SNR value is calculated and outputted since it provides a user with an indication of the transmission quality of channel 200. What this means is that if the latter SNR value is low, then the transmission quality of channel 200 may be poor, thereby making the former SNR value calculated at block 528 questionable.

At block 530, the AFIR filter coefficients are used to determine the frequency response and group delay of channel 200 as shown in the equations below. As is well-known from linear systems theory, the output of a discrete linear system, denoted as y(n), is equal to the input x(n) convolved with the system impulse response h(n), which may be mathematically stated as follows:

$$y(n) = x(n)*h(n) = \sum_{i=0}^{n-1} x(i)h(n-i)$$

Equivalently, this relationship may be expressed in the frequency domain by taking the Fourier Transform, which results in the following mathematical expression, $$Y(e^{j\omega}) = X(e^{j\omega})H(e^{j\omega})$$

where $$Y(e^{j\omega}) = \sum_{n=0}^{n-1} y(n) e^{-j\omega n}$$

represents the Fourier transform of the output y(n). Rearranging terms in the above equation results in the following expression:

$$H(e^{j\omega}) = Y(e^{j\omega})/X(e^{j\omega})$$

which is representative of the frequency response of the system with impulse response h(n). Since the impulse response of channel 200 has already been determined, and in fact, is equal to the coefficients of the AFIR filter from block 521, then the determination of the frequency response of channel 200 is readily accomplished by transforming the 200 coefficients, h(n), to the frequency domain by using an N point Fast Fourier Transform (FFT), as shown in block 530, where N=200. In an illustrative embodiment of the invention, H(k)=FFT[h(n)].

It is noted that operating on a table of 200 coefficients with a 512 point FFT requires "padding" the coefficient table with zeroes out to a length of 512 entries. The result of performing the 512 point FFT on the "padded" coefficient table is 512 points in the frequency domain that represents the channel 200 frequency response from minus one-half the sampling frequency to plus one-half the sampling frequency.

At block 531, the program determines the channel 200 group delay. This is accomplished by using the 512 frequency points obtained in block 530. By definition, the group delay $\tau_{gd}$ may be expressed as follows:

$$\tau_{gd}(\omega) = -d\frac{\theta}{d\omega}$$

which represents the first derivative of the phase ($\theta$) with respect to frequency. In general terms, the latter equation represents the delay that each frequency ($\omega$) experiences as it traverses channel 200, and is a useful parameter in gauging network performance. Each of the 512 frequency points that are output from block 530 contains a real component and imaginary component which is consistent with the Fast Fourier Transform. The real and imaginary components are representative of the phase response of the system, in particular channel 200, at the 512 frequency points through the following equation, $$\theta(k) = \text{Arctan}\left[\frac{\text{Imaginary } H(k)}{\text{Real } H(k)}\right]$$

where $\theta(k)$ is equal to the phase of the system at the $k^{th}$ FFT point, Real H(k) is equal to the real component of the $k^{th}$ FFT point, and imaginary H(k) is equal to the imaginary component of the $k^{th}$ FFT point.

Once the system phase response has been calculated, it is then possible to use an $n^{th}$ order approximation to the derivative above to determine the group delay. The present invention uses a first order approximation to the above derivative which is given by, $$\tau_{gd}(\omega) \approx -\left[\frac{\theta(k+1) - \theta(k)}{\Delta\omega}\right]$$

where $\Delta\omega$ equals the difference in frequency between adjacent FFT points and is a constant.

A higher order approximation to the derivative yields more accurate results for the group delay calculation. The results obtained at blocks 530 and 531 are then outputted via path 312 (FIG. 1). Following the foregoing, the program then exits via block 531.

Figure 6:
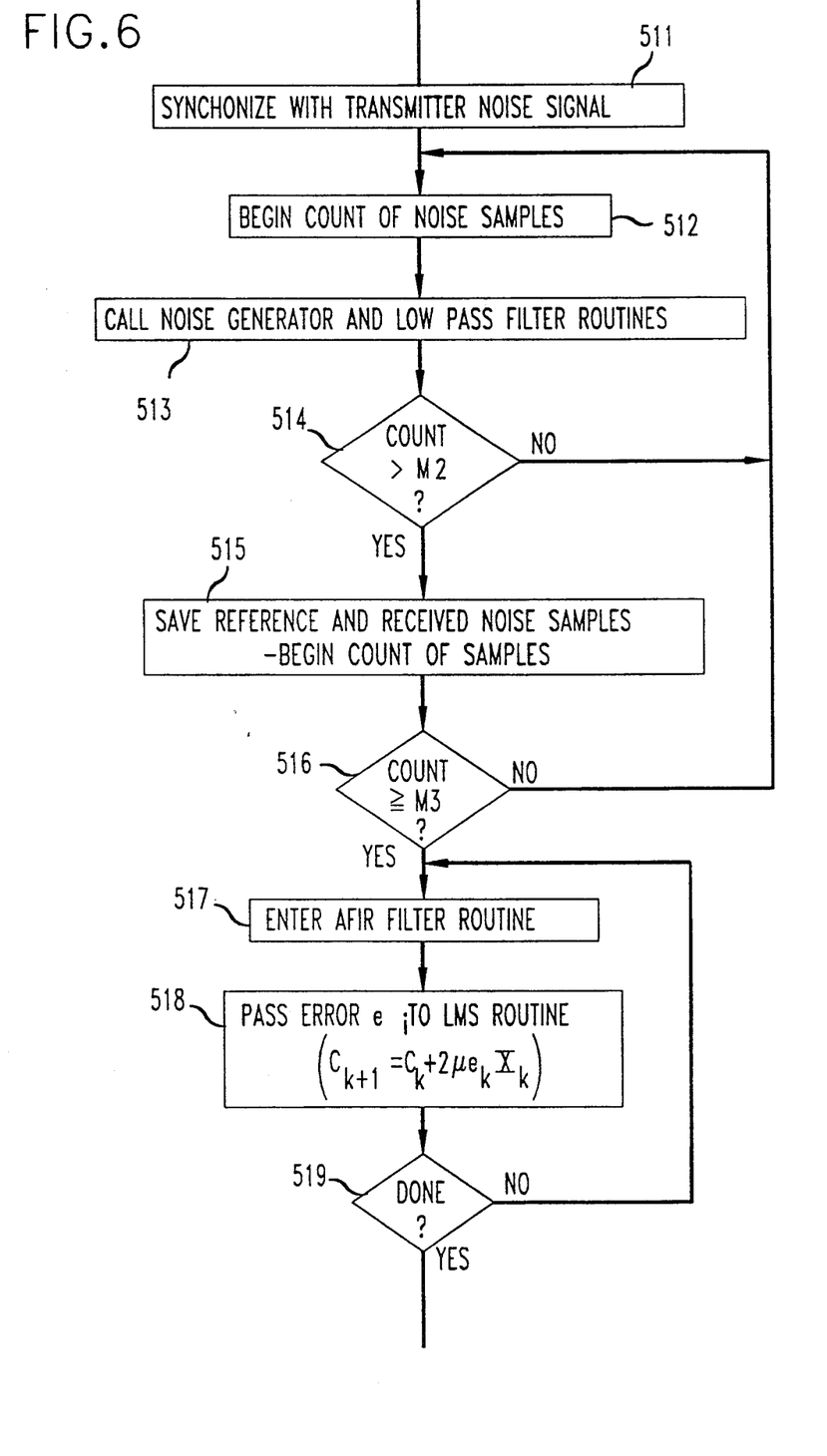
Figure 7:
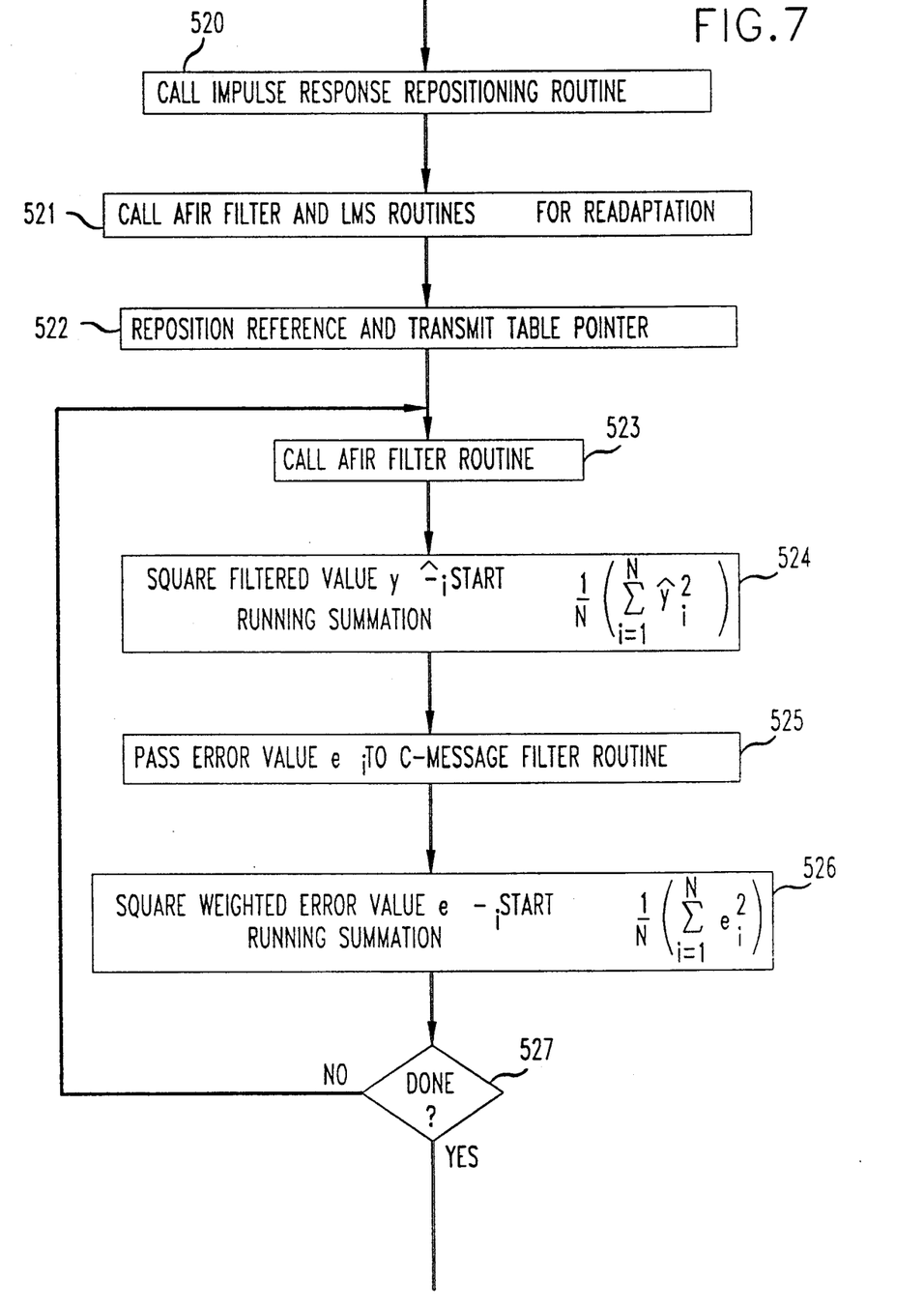
Figure 8:
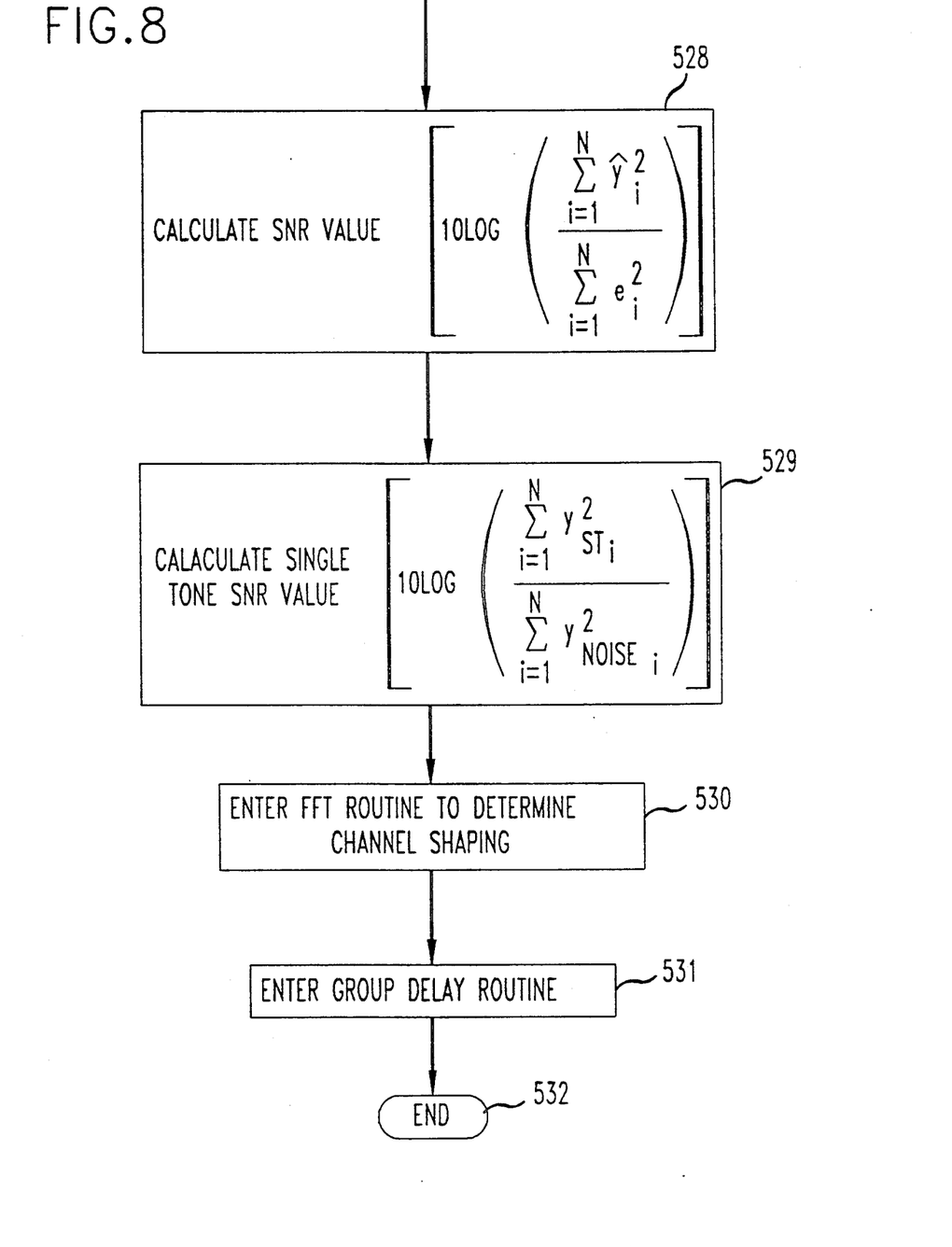
Figure 9:
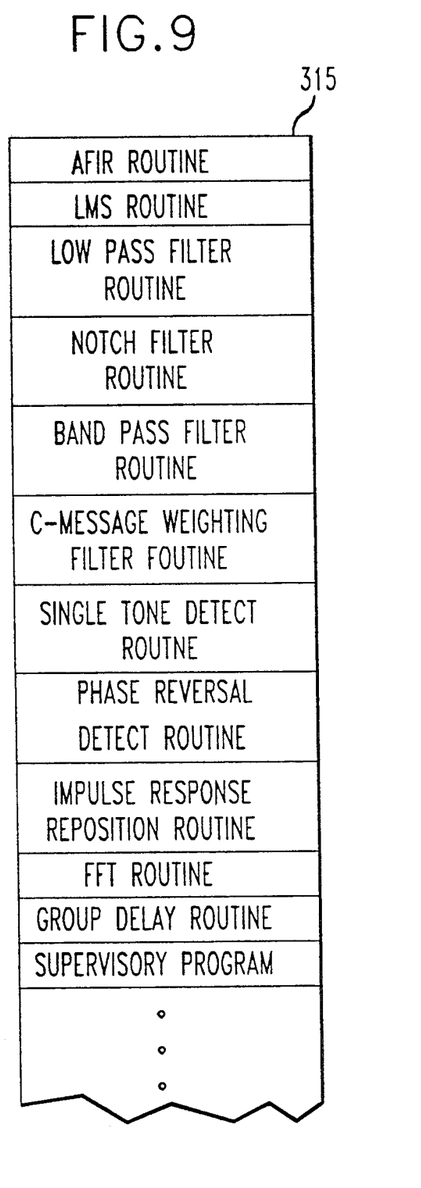
Figure 10:
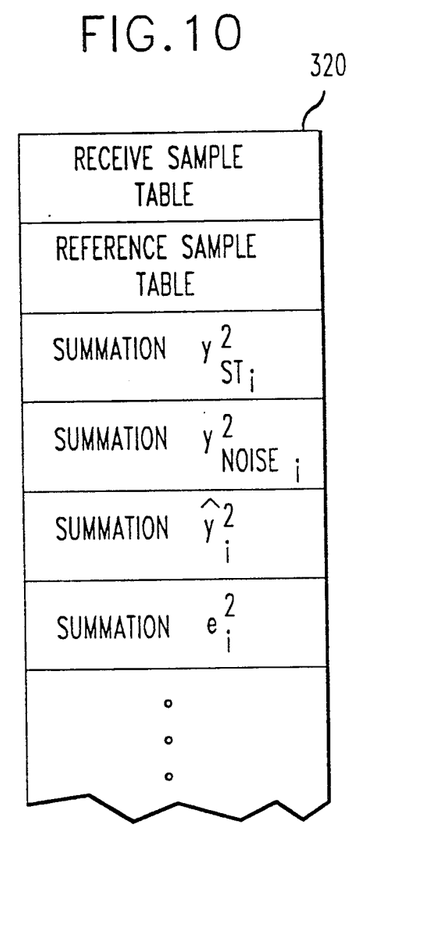

Turning now to FIG. 9, there is shown one possible ROM 315 layout for the storage of the various software routines which implement the invention and a supervisory program which enters those routines in the manner illustrated in FIGS. 5-7. Similarly, FIG. 10 shows one possible RAM 320 layout for the storage of the various digital samples, tap coefficient table and various SNR calculations discussed above in connection with FIGS. 5-8.

The foregoing is merely illustrative of the principles of our invention. Those skilled in the art will be able to devise numerous arrangements, which, although not explicity shown or described herein, nevertheless embody those principles that are within the spirit and scope of the invention.

We claim:

1. An arrangement for measuring signal-to-noise ratio of a communications channel comprising
    means for generating a pseudorandom noise signal constrained to a predetermined bandwidth and transmitting said constrained signal to said channel,
    means for sampling at a predetermined rate said constrained signal after it has propagated through said channel, means for generating a filtered response, $y_i$, with respect to each said sample of said constrained signal to determine the level of energy in each such sample and for calculating an error value, $e_i$, between each such filtered response, $y_i$, and an associated receive sample of said constrained signal, and means for calculating the signal-to-noise ratio of said channel as a function of each said filtered response, $y_i$, and each said error signal, $e_i$.

2. The arrangement set forth in claim 1 wherein said means for generating said constrained signal includes means for transmitting a signal having a predetermined frequency and phase to said channel, in which said transmission occurs for a predetermined duration commencing prior to the generation of said constrained signal, and in which the phase of said predetermined frequency signal is reversed after a predetermined segment of said duration has elapsed.

3. The arrangement set forth in claim 2 wherein said means for sampling includes means for detecting said phase reversal to determine the end of said duration and thus synchronize said sampling means with the transmission of said constrained pseudorandom signal over said channel.

4. The arrangement set forth in claim 2 wherein said means for sampling includes first and second filtering means, means for sampling said predetermined frequency signal and for passing said sample to said first and second filtering means to generate a first sample and a second weighted sample of said sample of said predetermined frequency signal, said first filtering means filtering out of said sample frequencies other than said predetermined frequency and said second filtering means filtering out of said sample said predetermined frequency and then generating a weighted version of the filtered result, means for calculating a first power summation involving the value of each said first filtered sample and a second power summation involving the value of each said second weighted sample, and means for generating a signal-to-noise ratio of said channel with respect to said predetermined frequency signal as a function of said first and second power functions.

5. The arrangement set forth in claim 1 wherein said means for sampling includes means for storing in a respective one of a first table of sequential locations of a memory said sample of said constrained signal as said sample is generated, and wherein said arrangement further comprises means, responsive to the generation of each said sample of said constrained signal, for generating a reference sample of said constrained signal, such that said reference sample is correlated in time with an associated sample of the propagated constrained signal and for storing in a respective one of a second table of sequential locations of said memory said reference sample as it is generated.

6. The arrangement set forth in claim 5 wherein said means for generating said filtered response is an adaptive finite impulse response filter having a predetermined number of tap coefficients.

7. The arrangement set forth in claim 6 wherein said channel has an impulse response and wherein said arrangement further comprises means for changing the values of said coefficients as a function of the value of each said error, $e_i$, so that said adaptive finite impulse response filter may converge on the impulse response of said channel.

8. The arrangement set forth in claim 7 wherein said means for generating said filtered response further comprises means, operative when said adaptive finite impulse response filter has filtered a predetermined number of said samples of said constrained signal, for generating an offset value as a function of the position within said adaptive finite impulse response filter of that one of said tap coefficients having the largest magnitude, means for refiltering the samples stored in said second table and, responsive to each succeeding filtered response, $y_i$, recalculating said error value, $e_i$, using a respective one of said reference samples stored in said second table, in which the first of said receive samples that is used is stored at a location of said first table that is offset by the value of said offset value, means, operative just prior to said refiltering, for initializing the values of said tap coefficients to predetermined values and, responsive to each new value of said error, $e_i$, for changing the values of said tap coefficients so that said adaptive finite impulse response filter may reconverge on said impulse response, and means, responsive to the refiltering of said predetermined number of samples contained in said second table and using the last values of said tap coefficients that were calculated as a result of such refiltering, for causing said adaptive finite impulse response filter to refilter those samples using just said last values of said tap coefficients, in which said signal-to-noise ratio of said channel with respect to said constrained signal is then calculated as a function of each filtered response, $y_i$, generated as a result of using the last values of said tap coefficients.

9. The arrangement set forth in claim 8 wherein said means for generating said filtered response further comprises means for determining channel shaping imposed by said channel on said constrained signal, in which said channel shaping is determined as a function of the last values of said tap coefficients.

10. The arrangement set forth in claim 8 wherein said means for generating said filtered response further comprises means for determining group delay imposed by said channel on said constrained signal.

11. A method for measuring signal-to-noise ratio of a communications channel comprising the steps of generating a pseudorandom noise signal constrained to a predetermined bandwidth and transmitting said constrained signal to said channel, sampling at a predetermined rate said constrained signal after it has propagated through said channel, generating a filtered response, $y_i$, with respect to each said sample of said constrained signal to determine the level of energy in each such sample and for calculating an error value, $e_i$, between each such filtered response, $y_i$, and an associated receive sample of said constrained signal, and calculating the signal-to-noise ratio of said channel as a function of each said filtered response, $y_i$, and each said error signal, $e_i$.

12. The method set forth in claim 11 wherein said step of generating said constrained signal includes the step of transmitting a signal having a predetermined frequency and phase to said channel, in which said transmission occurs for a predetermined duration commencing prior to the generation of said constrained signal, and in which the phase of said predetermined frequency signal is reversed after a predetermined segment of said duration has elapsed.

13. The method set forth in claim 12 wherein said step of sampling includes the step of detecting said phase reversal to determine the end of said duration and thus synchronize said step of sampling with the step of transmitting said constrained pseudorandom signal over said channel.

14. The method set forth in claim 12 wherein said step of sampling includes the step of
providing first and second filters,
sampling said predetermined frequency signal and passing said sample to said first and second filters to generate a first sample and a second weighted sample of said sample of said predetermined frequency signal, in which said first filter is used to filter out of said sample frequencies other than said predetermined frequency and in which said second filter is used to filter out of said sample said predetermined frequency and then generating a weighted version of the filtered result,
calculating a first power summation involving the value of each said first filtered sample and a second power summation involving the value of each said second weighted sample, and
generating a signal-to-noise ratio of said channel with respect to said predetermined frequency signal as a function of said first and second power functions.

15. The method set forth in claim 11 wherein said step of sampling includes the step of storing in a respective one of a first table of sequential locations of a memory said sample of said constrained signal as said sample is generated, and wherein said method further comprises the step of
responding to the generation of each said sample of said constrained signal by generating a reference sample of said constrained signal that is correlated in time with an associated sample of the propagated constrained signal and for storing in a respective one of a second table of sequential locations of said memory said reference sample as it is generated.

16. The method set forth in claim 15 wherein said step of generating said filtered response is an adaptive finite impulse response filter having a predetermined number of tap coefficients.

17. The method set forth in claim 16 wherein said channel has an impulse response and wherein said method further comprises the step of
changing the values of said coefficients as a function of the value of each said error, $e_i$, so that said adaptive finite impulse response filter may converge on the impulse response of said channel.

18. The method set forth in claim 17 wherein said step of generating said filtered response further comprises the steps of
responding to said adaptive finite impulse response filter having filtered a predetermined number of said samples of said constrained signal by generating an offset value as a function of the position within said adaptive finite impulse response filter of that one of said tap coefficients having the largest magnitude,
refiltering the samples stored in said second table and responding to each succeeding filtered response, $y_i$, by recalculating said error value, $e_i$, using a respective one of said receive samples stored in said first table, in which the first of said receive samples that is used is stored at a location of said first table that is offset by the value of said offset value,
prior to said refiltering, initializing the values of said tap coefficients to predetermined values and, responding to each new value of said error, $e_i$, by changing the values of said tap coefficients so that said adaptive finite impulse response filter may reconverge on said impulse response, and
responding to the refiltering of said predetermined number of samples contained in said second table by causing said adaptive finite impulse response filter using just the last values of said tap coefficients that were calculated as a result of such refiltering, to refilter those samples, in which said signal-to-noise ratio of said channel with respect to said constrained signal may then be calculated as a function of each filtered response, $y_i$, generated as a result of using the last values of said tap coefficients.

19. The method set forth in claim 18 wherein said step of generating said filtered response further comprises the step of determining channel shaping imposed by said channel on said constrained signal, in which said channel shaping is determined as a function of said last values of said tap coefficients.

20. The method set forth in claim 18 wherein said step of generating said filtered response further comprises the step of determining group delay imposed by said channel on said constrained signal.

* * * * *